United States Patent [19]

Ertle et al.

[11] Patent Number: 4,996,001

[45] Date of Patent: Feb. 26, 1991

[54] PUFFED BORAX AS AN AGGLOMERATING AID

[75] Inventors: Raymond T. Ertle, Pompton Plains; Robert P. Arbaugh, Westampton, both of N.J.

[73] Assignee: Capital City Products Company, Columbus, Ohio

[21] Appl. No.: 300,476

[22] Filed: Jan. 23, 1989

[51] Int. Cl.[5] .......................... C11D 7/38; C11D 7/00; C09K 3/00

[52] U.S. Cl. ...................................... 252/99; 252/135; 252/385

[58] Field of Search .......................... 252/99, 135, 385

[56] References Cited

U.S. PATENT DOCUMENTS

| | | | |
|---|---|---|---|
| 3,533,942 | 10/1970 | Rhees | 252/8.8 |
| 3,609,088 | 9/1971 | Sumner | 252/99 |
| 3,671,439 | 6/1972 | Corey | 252/99 |
| 3,882,034 | 5/1975 | Gibbons | 252/99 |
| 3,888,781 | 6/1975 | Kingry | 252/99 |
| 3,956,197 | 5/1976 | Schoenholz | 252/526 |
| 3,986,987 | 10/1976 | D'Souza | 252/527 |
| 4,395,347 | 7/1983 | McLaughlin | 252/139 |
| 4,524,012 | 6/1985 | Wixon | 252/174 |
| 4,547,352 | 10/1985 | Ertle | 423/279 |
| 4,786,432 | 11/1988 | Kanfer | 252/120 |

OTHER PUBLICATIONS

Rhees, R. C., et al. "Puffed Borax", *Soap and Chemical Specialties,* Jan. 1966, pp. 58–61 & 118–120.

*Primary Examiner*—Paul Lieberman
*Assistant Examiner*—Kevin McCarthy
*Attorney, Agent, or Firm*—Klauber & Jackson

[57] ABSTRACT

According to the invention, in a process for agglomerating a mass of particulates containing hydratable or hydrated inorganic salts wherein the particulates are sprayed with a silicate solution to form agglomerates and the resulting agglomerates are subjected to an aging/drying step to allow hydration equilization and excess water evaporation, the improvement comprises replacing a portion of the particulates with puffed borax as an agglomerating aid to minimize aging/drying time.

8 Claims, No Drawings

PUFFED BORAX AS AN AGGLOMERATING AID

This invention has been the subject of a Disclosure Document, filed at the U.S. Patent Office on July 27, 1987, under No. 174514. Such Disclosure Document is hereby incorporated by reference.

1. Field of the Invention

This invention relates to an improvement in processes in which hydratable inorganic salts in particulate form are agglomerated by treatment with an alkali metal silicate to form agglomerates, followed by an aging period in which the agglomerated material is tumbled in the presence of ambient or heated air.

2. Background of the Invention

It is known to agglomerate hydratable inorganic salts in particulate form by overspraying them with a sodium silicate solution to hydrate the salts and to form agglomerates, followed by an aging period to complete the hydration in which the agglomerated material is usually tumbled in the presence of an inert gas, suitably air at ambient or elevated temperature or by prehydrating the inorganic salts, agglomerating with silicate, and subsequently drying the agglomerate to remove excess water added to the system. Typically the agglomerated salts, together with other adjuncts such as surfactants, builders, etc., are useful in detergent compositions such as dishwasher or laundry compositions where it is desired to provide a granular product. The adjuncts may be post-added to the agglomerates, or included before or during the agglomeration process, whereby they become an integral component of the agglomerated particles.

In such agglomeration processes, a significant aging or drying step must be included to allow the hydrated salts to reach equilibrium, thereby preventing subsequent caking of the agglomerates, e.g., in a consumer package, rendering the material unusable. This aging or drying step usually involves a capital expenditure for the aging/drying equipment and energy to operate the equipment. More significantly, this conditioning step invariably limits total system production rates.

In most agglomeration processes, sodium silicate solution is used as the agglomerating agent. The alkalinity of this material depends upon its ratio of $Na_2O$ to $SiO_2$. Detergent grade silicates have an $Na_2O:SiO_2$ ratio of from about 1:1 to about 1:3.2, with $1Na_2O:2.4SiO_2$ being a common ratio. This material is usually supplied with a solids content of 45 to 47% solids. Other binders, such as solutions of the sodium salts of polyacrylic acid (polyacrylates) may also be used.

In conventional agglomeration processes, mixtures of salts, surfactants, adjuvants, etc. are oversprayed with a silicate solution. The silicate is tacky in nature and tends to glue the finer particles together, the result being a more homogeneous mixture with a larger average particle size than that of the starting materials.

Normally, most of the water contained in the silicate is taken up by the hydratable salts in the formulation during the silicate application period or during a subsequent aging period in which the agglomerated material is tumbled or agitates in the presence of ambient or heated air. Some portion of the water contained in the silicate is also subject to evaporational loss at this point.

U.S. Pat. No. 2,895,916, assigned to the Procter and Gamble Company, discusses the caking problem caused by the presence of unhydrated salts as it affects the dishwasher cycle. An aging period of about four hours is disclosed.

U.S. Pat. No. 3,625,902, assigned to Stauffer Chemical Company, describes apparatus useful in forming the agglomerates. A method is disclosed of producing agglomerates of detergent ingredients by charging particulate detergent ingredients into an agglomeration zone and maintaining a falling curtain of said ingredients in said zone, contacting said particulate material in said falling curtain with liquid material to agglomerate said particulate material, maintaining a tumbling bed of agglomerating ingredients at the base of said falling curtain and withdrawing agglomerated material from said agglomeration zone. In Example I, agglomerated material was cooled or aged for 20–30 minutes. Transferring agglomerates to a rotary cooler results in an aging or cooling time of 10–15 minutes minimum.

U.S. Pat. No. 3,933,670, assigned to Economic Laboratories, Inc., discusses detergent builder salts, which may include, inter alia, borates. Aging times of 0.2 to 1 hour are disclosed. The caking problem is again discussed.

All of the above patents employ an alkali metal silicate as agglomerating agent.

In U.S. Pat. No. 4,237,024, assigned to Certified Chemicals, Inc., a method of making a dishwashing composition is disclosed which comprises mixing an aqueous solution of sodium hypochlorite with substantially dry ingredients including phosphates known as sequestering agents or builder salts and a carrier material. An alkali metal silicate is also added in substantially dry form and/or as an aqueous solution. Agitation is continued until agglomerated granules of the desired size are attained. Following agglomeration, the composition is conditioned to reduce the moisture content, resulting in a substantially dry, granular dishwashing composition. In Example I of the patent, the final conditioning took about 48 hours. The preferred carrier materials include sodium chloride, potassium chloride, sodium carbonate, potassium carbonate, sodium sulfate, potassium sulfate, sodium bicarbonate, borax, or mixtures thereof U.S. Pat. No. 4,427,417, assigned to the Korex Company, deals with the same problem Applicant is concerned with, namely, the tendency of agglomerated products to cake. Most of the inorganic salts used in detergent type agglomerates have the ability to take up water as water of hydration. Some hydration states are more stable than others. In any case, when hydration occurs while particles are at rest and in intimate contact, a surface melting appears to occur while the particles hydrate, and particles knit or weld together, causing caking. The patentee's solution is to pre-hydrate the hydratable salts so that this post-hydration cannot occur. In the formulations, generally sodium tripolyphosphate and sodium carbonate are present as hydratable salts. Other hydratable salts may be substituted for them such as potassium carbonate, potassium acetate, potassium borate, potassium orthophosphate, sodium acetate, sodium sulfate, sodium meta or tetra borate (borax) and sodium formate.

In that approach the salts are already hydrated so the greatest part of the silicate moisture must be evaporated, and fluid bed dryers are employed to accomplish this. From an energy requirement and production rate standpoint, this is not the most effective process to use, since the majority of the silicate water must be evaporated, rather than allowing it to be taken up as water of hydration.

With normal agglomerating processes, however, caking problems do exist. Applicant believes they are caused, for the most part, by the inability of the silicate to give up its water quickly, while the mass is still in motion. Silicate solutions are inherently tacky and viscous, and become tackier and more viscous as water is removed. Thus when most of the water is removed, the remaining water becomes trapped in the viscous medium. If enough entrapped water remains after the conditioning step, and is later released while the material is at rest, such as in a consumer package, the material will cake, rendering it unusable.

An object of this invention is to provide a process in which non-caking products can be consistently produced without the necessity of pre-hydrating, while requiring minimal amounts of aging and/or drying.

SUMMARY OF THE INVENTION

According to the invention, in a process for agglomerating a mass of particulates containing hydrated or hydratable inorganic salts wherein the particulates are sprayed with a silicate solution to form agglomerates and the resulting agglomerates are subjected to an aging/drying step to allow hydration equalization and excess water evaporation; the improvement comprises replacing a portion of the particulates with puffed borax as an agglomerating aid to minimize aging/drying time.

Although various methods for producing puffed borax may be employed, a method and apparatus for manufacturing improved puffed borax are disclosed in U.S. Pat. No. 4,412,978 issued Nov. 1, 1983, to Raymond T. Ertle, which is incorporated herein by reference.

Puffed borax can also be produced by use of the so-called "borax gun", one type of which is disclosed in U.S. Pat. No. 3,454,357 to Rhees and Hammar, or by the process and apparatus described in U.S. Pat. No. 3,882,034 to Gibbons, or by other methods known in the art which serve to intumesce hydrated sodium borate.

The inclusion of puffed borax as a replacement for a portion of the inorganic salts ordinarily used in the formulation accomplishes this feat, although the mechanism is not completely understood at present. That puffed borax provides the striking improvements of the present invention is surprising and totally unexpected, particularly in that (as will be seen infra) crystalline unpuffed borax is relatively ineffective in lowering aging requirements.

The puffed borax will typically be present as at least 2% by weight of the initial feed mixture (before addition of the binding solution). Additional levels of up to 90% or even somewhat higher may be employed where the formula to be agglomerated requires higher than usual amounts of binding solution. A preferred level of addition is from about 3 to about 20% of the feed mixture.

While we do not wish to be bound by any particular theory, it appears that the mechanism involved is as follows: Caking occurs between particles or crystals of inorganic salts where water of hydration passes across the surfaces of the particles or crystals while they remain in intimate contact. Some surface dissolution occurs with subsequent resolidification upon the completion of the transfer of hydration water, thereby causing a welding together of the particle or crystal involved in the transfer. By inserting particles of puffed borax into the agglomerate matrix, particle welding necessarily involves attachment to the surface of puffed borax particles, which consists of relatively thin, blister-like formations. Hydration water transfer across these boundries causes a solubilization of the blister-like surface, leaving the crystals without a common attachment point necessary for caking, thereby preventing it.

Aging or drying requirements are directly related to a product's tendency to cake. Thus, caking tendency, and the degree of caking encountered in a batch with no aging, can be related to aging requirements. An unaged batch which forms a hard solid cake when left undisturbed in a sealed container will require significantly higher aging times to yield an acceptable product than a batch which forms no cake or an easily friable cake under the same conditions. Another indication of aging requirements is the ability of a batch in a sealed container to remain free flowing after the initial cake is broken up. Subsequent recaking is an indication that aging requirements are higher than if recaking is not experienced.

The following examples are to be considered as illustrative but not limitative of the invention.

EXAMPLE I

Agglomerated bases were prepared in a three cubic foot baffled rotary mixer according to the following formulations:

| | Parts by Weight | |
|---|---|---|
| | A | B |
| Anhydrous Sodium Carbonate (0.95 g/cc) | 20.00 | 18.25 |
| Puffed Borax (0.20 g/cc) | — | 1.75 |
| Sodium Silicate ($1Na_2O$:$2.4SiO_2$-47% Solids) | 2.00 | 2.00 |

For each base, dry materials were charged into the rotating mixer and the batch quantity of sodium silicate was sprayed onto the moving powder bed. After each batch was completed, mixer rotation was halted for 15 minutes and the caking tendency of each batch was noted upon restarting the mixer.

Upon restarting, batch A was found to be completely caked, with the caked mass firmly attached to the mixer wall in one piece. The caked mass was manually broken up into a powder and stored in a sealed container.

Batch B, upon restarting, was found to be completely free-flowing, with no evident lumps. Batch B was also stored in a sealed container.

After 72 hours, both sealed containers were opened and inspected for signs of caking. Batch A was found to have recaked into a hard solid mass. Batch B, on the other hand, was found to be completely free-flowing.

EXAMPLE II

Formula ingredients were charged into a rotating drum with a diameter of 11¾" and a depth of 14½". The drum contained four equally spaced internal flights ½" high and 10" long which extended from the bottom of the drum toward the open end. The axis of the drum rotation was canted 22.5° from the horizontal and was rotated at 48 RPM with a gearhead electric motor.

The dry materials were allowed to mix for 30 seconds, whereupon the formula amount of silicate was sprayed into the curtain of dry materials formed as the material spilled off the internal flights by means of a Badger model 150 air brush fitted with a HD needle and head. Air was supplied to the unit by a diaphragm pump capable of sustaining an 8 psi air supply with the air brush valve wide open.

| | Formula Weight in Grams | | | | |
|---|---|---|---|---|---|
| | A | B | C | D | E |
| Sodium carbonate | 600 | 600 | 600 | 600 | 750 |
| Sodium tripolyphosphate | 200 | 200 | 200 | 200 | 250 |
| Puffed borax (0.07 g/cc) | 200 | — | — | — | — |
| Puffed borax (0.20 g/cc) | — | 200 | — | — | — |
| Puffed borax (0.30 g/cc) | — | — | 200 | — | — |
| Borax pentahydrate (granular) | — | — | — | 200 | — |

To each of the above mixtures, 150 g of a sodium silicate solution having a solids content of 37.6% and an $Na_2O$:$SiO_2$ ratio of 1:2.4 was applied with the Badger air-brush.

Upon completion of the silicate addition for each formulation, the mass was allowed to rotate for 60 seconds to equilibrate, and a 100 $cm^3$ grab sample was taken from the mixer and immediately transferred to a glass 8 oz. jar. The jar was then tightly sealed with a polypropylene screw thread cap to prevent water evaporation and allowed to remain undisturbed at 70° F. for a period of 72 hours.

After 72 hours, the sealed samples were subjected to the following test:

A drop test jig consisting of a wooden platform 6"×8"×¾" thick is prepared. Three dowels each having a length of 20" and a diameter of 3/8" are press fitted into three 3/8" holes drilled into the surface of the platform 120° apart on a three inch diameter circle The platform area between the upright dowels is covered with a Nalgene® #6283 ¾" thick polyethylene foam sheet. One of the dowels is marked in one inch increments starting from the top surface of the foam sheet and continuing upward.

Each sample was tested in the following manner:

The jar is carefully inverted, and any loose material is noted. The jar is then inserted at the top of the dowels and carefully brought down to the 1" mark. The jar is released, allowing it to impact, cap first, squarely on the foam pad. The jar is removed from the test jig and an estimate of the percentage of powder loosened by the impact is made and noted. This procedure is repeated, the second drop being made at the 2" mark, the third at the 3" mark, etc. Successively higher drops are continued until either all of the material in the jar is loose and free-flowing, or a height of 15" is reached. Heights above 15" should not be attempted since the impact might serve to shatter the test jar.

Results achieved for samples A, B, C, D and E are as follows:

| | % Free at Drop Height (Inches) | | | | | | | | | | | | | | |
|---|---|---|---|---|---|---|---|---|---|---|---|---|---|---|---|
| | Inches | | | | | | | | | | | | | | |
| Sample | 1 | 2 | 3 | 4 | 5 | 6 | 7 | 8 | 9 | 10 | 11 | 12 | 13 | 14 | 15 |
| A | 40 | 60 | 80 | 95 | 100 | | | | | | | | | | |
| B | 0 | 0 | 5 | 20 | 40 | 50 | 70 | 80 | 90 | 95 | 100 | | | | |
| C | 0 | 0 | 0 | 5 | 10 | 30 | 50 | 60 | 70 | 85 | 90 | 95 | 100 | | |
| D | 0 | 0 | 0 | 0 | 0 | 0 | 0 | 0 | 0 | 0 | 2 | 5 | 20 | 30 | 40 |
| E | 0 | 0 | 0 | 0 | 0 | 0 | 0 | 0 | 0 | 0 | 0 | 2 | 10 | 15 | 20 |

It should be noted that the samples containing granular borax and no borax did not become free flowing under the maximum test conditions.

After testing, samples were again allowed to remain undisturbed for 72 hours at 72° F., and after this period were visually checked for free-flow. Samples A, B and C containing puffed borax were found to be completely uncaked and free-flowing; samples D and E were solidly caked, and it was noted that the portion of the material previously loosened during the drop test had recaked, yielding a single solid mass.

EXAMPLE III

Samples of hydrated sodium carbonate and sodium tripolyphosphate were prepared as follows:

1000 parts anhydrous sodium carbonate were charged to a rotating drum mixer and 170 parts water were added to the carbonate as a fine spray. The mixture was transferred to a sealed container and allowed to remain at 40° C. for 10 minutes. The material was then allowed to age for a period of 72 hours at ambient temperature to insure thorough hydration.

This same procedure was used to produce hydrated sodium tripolyphosphate with the exception that 273 parts of water were added to 1000 parts of the hydratable salt.

The following formulas were then prepared:

| | Parts by Weight | |
|---|---|---|
| | F | G |
| Hydrated sodium carbonate | 600 | 750 |
| Hydrated sodium tripolyphosphate | 200 | 250 |
| Puffed borax (0.20 g/cc) | 200 | — |

Employing the methods and equipment described in Example II above, 150 parts of sodium silicate solution having an $Na_2O$:$SiO_2$ ratio of 1:2.4 and a solids content of 37.6% were added to each formula. 50 $cm^3$ grab samples were taken from the mixer and immediately transferred to tightly capped 8 oz. glass jars. Samples were taken immediately after the completion of silicate addition (TO), and at 1, 5 and 10 minutes thereafter (T1, T5, T10, respectively). These samples were taken as 50 $cm^3$ grab samples from the mixer while rotation was allowed to continue, each sample being immediately transferred to a glass 8 oz. jar and sealed with a polypropylene cap. All samples were held, undisturbed, for 72 hours at ambient temperature and were subsequently subjected to the drop test described in Example II. Additionally, samples which were not 100% decaked after incremintally being dropped from a height of 15" were subjected to additional 15" drops until they became completely decaked. Results obtained for the drop test, along with the number of 15" drops required to decake are listed below.

It should be noted that all G samples were still not decaked at 40 drops at 15", and in fact, material loosened in previous drops recompacted into one single solid cake.

| | % Free at Drop Height (Inches) Inches | | | | | | | | | | | | | | | No. Drops @ 15" |
|---|---|---|---|---|---|---|---|---|---|---|---|---|---|---|---|---|
| Sample | 1 | 2 | 3 | 4 | 5 | 6 | 7 | 8 | 9 | 10 | 11 | 12 | 13 | 14 | 15 | for 100% Free |
| F T0 | 0 | 0 | 0 | 0 | 0 | 0 | 0 | 0 | 0 | 0 | 0 | 50 | 60 | 75 | 80 | 15 |
| F T1 | 0 | 0 | 0 | 0 | 0 | 0 | 0 | 0 | 0 | 50 | 50 | 60 | 70 | 80 | 90 | 7 |
| F T5 | 0 | 0 | 0 | 0 | 0 | 15 | 50 | 60 | 75 | 80 | 85 | 90 | 95 | 100 | — | 0 |
| F T10 | 0 | 0 | 0 | 0 | 0 | 0 | 0 | 0 | 15 | 20 | 40 | 50 | 70 | 80 | 90 | 3 |
| G T0 | 0 | 0 | 0 | 0 | 0 | 0 | 0 | 15 | 15 | 15 | 15 | 0 | 0 | 0 | 0 | >40 |
| G T1 | 0 | 0 | 0 | 0 | 0 | 0 | 0 | 0 | 0 | 0 | 0 | 0 | 0 | 0 | 0 | >40 |
| G T5 | 0 | 0 | 0 | 0 | 0 | 0 | 0 | 0 | 0 | 0 | 0 | 0 | 0 | 0 | 0 | >40 |
| G T10 | 0 | 0 | 0 | 0 | 0 | 0 | 15 | 15 | 15 | 15 | 15 | 0 | 0 | 0 | 0 | >40 |

EXAMPLE IV

The samples of Example III were uncapped and allowed to remain undisturbed for a period of 48 hours to allow moisture evaporation. After this time period the samples were carefully recapped and subjected to the drop test described in Examples II and III above. Results are contained in the following table:

| | % Free at Drop Height (Inches) Inches | | | | | | | | | | | | | | | No. Drops @ 15" |
|---|---|---|---|---|---|---|---|---|---|---|---|---|---|---|---|---|
| Sample | 1 | 2 | 3 | 4 | 5 | 6 | 7 | 8 | 9 | 10 | 11 | 12 | 13 | 14 | 15 | for 100% Free |
| F T0 | | | 100% with inversion only | | | | | | | | | | | | | 0 |
| F T1 | | | 100% with inversion only | | | | | | | | | | | | | 0 |
| F T5 | | | 100% with inversion only | | | | | | | | | | | | | 0 |
| F T10 | | | 100% with inversion only | | | | | | | | | | | | | 0 |
| G T0 | | | | | | | | | | 20 | 20 | 60 | 60 | 60 | 80 | >60<br>(5% remaining) |
| G T1 | | | | | | 10 | 20 | 30 | 50 | 50 | 50 | 70 | 70 | 70 | 70 | 32 |
| G T5 | | | | | | | | | | 5 | 5 | 5 | 5 | 5 | 50 | 39 |
| G T10 | 5 | 5 | 5 | 5 | 5 | 5 | 5 | 5 | 5 | 5 | 5 | 5 | 5 | 5 | 5 | >60<br>(90% remaining) |

It is quite evident from these results that the G samples would require significantly longer aging/drying times than the F samples which contain puffed borax.

EXAMPLE V

The following batches were prepared employing the methods and equipment described in Example II:

| | H | I | J | K | L |
|---|---|---|---|---|---|
| Sodium carbonate | 600 | 750 | 400 | 690 | 400 |
| Sodium tripolyphosphate | 200 | 250 | 200 | 230 | 200 |
| Sodium chloride | — | — | 200 | — | 200 |
| Puffed borax (0.20 g/cc) | 200 | — | — | — | 200 |
| Puffed borax (0.07 g/cc) | — | — | 200 | 80 | — |

150 grams of sodium silicate solution having an $Na_2O:SiO_2$ ratio of 1:2.4 and a solids content of 37.6% were sprayed onto each of the above formulations and immediately upon completion of each batch, a stream of hot air (130° F.) was directed into the rotating mixer at a rate of 18 cfm. 50 $cm^3$ grab samples were taken from the mixer at one minute intervals for a total of 12 minutes. Grab samples were transferred when taken into 8 oz. glass jars and sealed with a polypropylene cap, and were allowed to remain undisturbed for a period of 24 hours.

At the end of this period, all samples were subjected to a 1" drop test employing the device described in Example II. Total decaking at a drop height of 1" was deemed to represent the point at which normal packaging, distribution and handling would completely decake an agglomerated product, yielding material suitable for sale to the consumer.

Results are reported for each formulation as the sample with the shortest aging/drying time to be completely decaked with a 1" drop. Decaked samples were also allowed to remain sealed and undisturbed for a period of 72 hours at ambient temperature, and were then checked for caking by inverting each sample and noting its condition.

| | Sample with Shortest Aging to Decake with 1" Drop | Recaked 72 Hours After Drop Test |
|---|---|---|
| H | T5 | No |
| I | T11 | No |
| J | T2 | No |
| K | T5 | No |
| L | T5 | No |

It will be noted that samples containing puffed borax only required between 18 to 45% of the aging time required by the batch which did not contain puffed borax. Thus, increases in aging rates of between 220 and 550% were achieved. Lowest aging times suggest that normal transport of agglomerates through production plant handling equipment such as shaker screens, bucket elevators, belts, hoppers and packaging equipment would supply sufficient aging/drying to insure that the agglomerates would remain uncaked and free-flowing.

It should also be noted that batch J exhibited reduced aging/drying time, even though a significant portion of the hydratable salts were replaced by sodium chloride without a corresponding lowering of the amount of water added to the system with the sodium silicate solution.

While the present invention has been particularly set forth in terms of specific embodiments thereof, it will be understood in view of the instant disclosure, that numerous variations upon the invention are now enabled to those skilled in the art, which variations yet reside within the scope of the present teaching. It would be obvious, for instance, to add or substitute ingredients depending upon the properties desired in the finished formulation. Water, additional to that added with the liquid silicate, may be added as a separate entity, or by adding it to the required formula amount of liquid silicate. Anionic, cationic, nonionic and/or amphoteric surfactants may be added, as well as foam boosters or suppressants, enzymes, perfumes, colorants, chlorine releasing agents, anti-redeposition agents, tarnish inhibitors and chelating agents and phosphate replacements such as citrates, sodium salts of polyacrylic acids and/or nitrilotriacetate (NTA) to impart various performance attributes to a composition. Builders and diluents such as sodium sulfate, sodium chloride, sodium sesquicarbonate, sodium borate, sodium metasilicate, anhydrous sodium and potassium silicates, along with various sodium or potassium phosphates and other hydratable or non-hydratable salts may be added to, or in place of, the particulates in the base formulation. It should be noted, in the case of borates, that only puffed or intumesced borax will yield the unexpected lowering of aging/drying requirements as is herein described.

Accordingly, the invention is to be broadly construed, and limited only by the scope and spirit of claims now appended hereto.

What is claimed is:

1. In a process for agglomerating a particulate mixture which includes predominantly one or more hydratable or hydrated inorganic salts; wherein the particulate mixture is sprayed while being agitated with an alkali metal silicate solution as a binder solution to form agglomerates which include the said salts, and the resulting agglomerates are subjected to an aging/drying step; the improvement which comprises using puffed borax in admixture with said particulates as an agglomerating aid to reduce aging/drying time, the puffed borax comprising from about 2% to about 90% of the total particulate initial feed mixture before addition of the silicate solution.

2. The process as set forth in claim 1, wherein said puffed borax comprises from about 3% to about 20% of the total mixture.

3. The process as set forth in claim 1, in which the hydrated or hydratable salts include sodium carbonate and sodium tripolyphosphate.

4. The process as set forth in claim 1, in which the alkali metal silicate solution is sodium silicate solution.

5. The process as set forth in claim 2, in which the silicate is sodium silicate.

6. The process as set forth in claim 1, in which the puffed borax has a density in the range of 0.03 $g/cm^3$ to 0.60 $g/cm^3$.

7. The process as set forth in claim 1, wherein said salts include sodium carbonate.

8. The process as set forth in claim 1, wherein said salts include sodium tripolyphosphate.

* * * * *

UNITED STATES PATENT AND TRADEMARK OFFICE

CERTIFICATE OF CORRECTION

PATENT NO. : 4,996,001

DATED : February 26, 1991

INVENTOR(S) : R.T. Ertle et al

It is certified that error appears in the above-identified patent and that said Letters Patent is hereby corrected as shown below:

At column 1, line 63, change "agitates" to -- agitated --.

At column 4, line 4, change "boundries" to -- boundaries --.

At column 5, line 3, insert as a separate paragraph -- The following formulations were prepared: --; at line 31, insert --.-- (a period) after the word "circle".

At column 6, line 49, change "incremintally" to -- incrementally --.

In claim 1, column 10, line 10, add after "solution"--; and said silicate solution being the sole agglomerating agent utilized in said method.--.

Signed and Sealed this

Eighteenth Day of August, 1992

*Attest:*

DOUGLAS B. COMER

*Attesting Officer* *Acting Commissioner of Patents and Trademarks*